Nov. 27, 1962   E. C. CHAPMAN   3,065,536
PRESSURE WELDING USING COOLING CONTRACTION TO
PRESS MEMBER ENDS TOGETHER
Original Filed June 22, 1956

INVENTOR
E. Corbin Chapman
BY
C. F. Bryant
ATTORNEY

United States Patent Office 3,065,536
Patented Nov. 27, 1962

3,065,536
PRESSURE WELDING USING COOLING CONTRACTION TO PRESS MEMBER ENDS TOGETHER
Edward C. Chapman, Lookout Mountain, Tenn., assignor to Combustion Engineering, Inc., New York, N.Y., a corporation of Delaware
Original application June 22, 1956, Ser. No. 593,144. Divided and this application Oct. 2, 1957, Ser. No. 687,641
3 Claims. (Cl. 29—493)

The invention of this application relates to butt welding tubes and other metal members by the simultaneous application of heat and pressure, and the subject matter hereof has been divided from co-pending "parent" U.S. application Serial No. 593,144 filed June 22, 1956, now abandoned in the name of Edward Corbin Chapman under title of "Pressure Welding Using Thermal Expansion To Press Member Ends Together."

Generally stated the object of this invention is to provide an improved method and apparatus for placing the abutted member ends under the pressure that is needed to establish a satisfactory weld therebetween when the metal of those member ends is heated to an appropriate welding temperature.

A more specific object is to broaden the application of existing butt-welding techniques and to permit those techniques successfully to be used in the field and in other situations not previously open to them.

Another object is to permit a successful butt welding of pipe and other metal members whose diameters and wall thicknesses are comparatively large.

An additional object is to cut down the welding time that is needed to joint the abutted ends of such large piping.

Other objects and advantages will become apparent as the disclosure and description hereof proceeds.

In practising the invention of the present divisional application I obtain the required pressure between the abutted ends of the tubes or other members being welded by mechanically tying those members together through anchor points on opposite sides of the end abutting location and then heating the material of the mechanical tie means before bringing the abutted member ends together and utilizing the cooling contraction of those tie means to build up the needed welding pressure between said ends.

An illustrative embodiment of the invention is shown in the accompanying drawings wherein.

Figure 1:
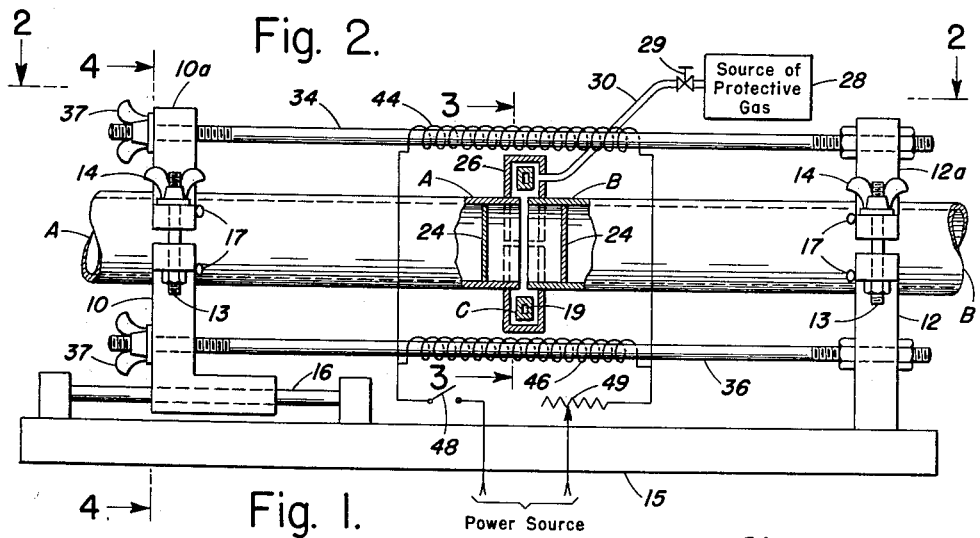
FIGURE 1 is a cross section, taken on line 1—1 of FIG. 3, showing means for mechanically tying the two abutted tubes together through anchor points on opposite sides of the end abutting location, and also showing the approximate location of localized weld heating means and of tie-member expansion heating means with respect to the two tube ends to be welded.
Figure 5:
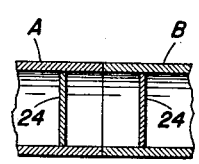
Figure 6:
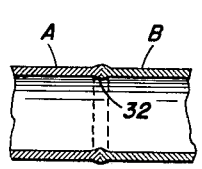

FIG. 5 is a simplified cross sectional view corresponding to the central portion of FIG. 1 but differing therefrom by showing the two tube ends abutted together preparatory to an establishment of welding pressure therebetween; and FIG. 6 is a cross sectional view corresponding to FIG. 5 but differing therefrom by showing the two tube ends after same have been secured together by the improved welding technique herein disclosed.

The improvements of this invention are useable with pressure welding methods of various types and hence are not restricted to the here illustrated butt welding of tube ends that receive localized welding heat via electrical induction; instead they may also find utility in the welding of a wide variety of other objects including solid bars and structural shapes or members and in connection with sources of localized welding heat other than the high frequency inductor heating means here represented.

In the drawing views hereof, the ends of two tubes that are to be welded together are represented at A and B. These two tubes are mounted in alignment by the aid of clamp blocks shown at 10 and 12 in FIGS. 1 and 2; and guides (not shown) extending upwardly from base 15 can if desired be employed to assure proper alignment of the abutted tube ends. These two blocks are respectively provided with removeable upper halves 10a and 12a, plus securing bolts 13 and removeable wing nuts 14. Clamp block 12 is shown as being stationarily mounted upon one end of said base 15; while the companion clamp block 10 is carried by the other end of the same base in a way permitting movement thereby along guide rods 16 lengthwise of the supported tubes A and B.

Figure 2:
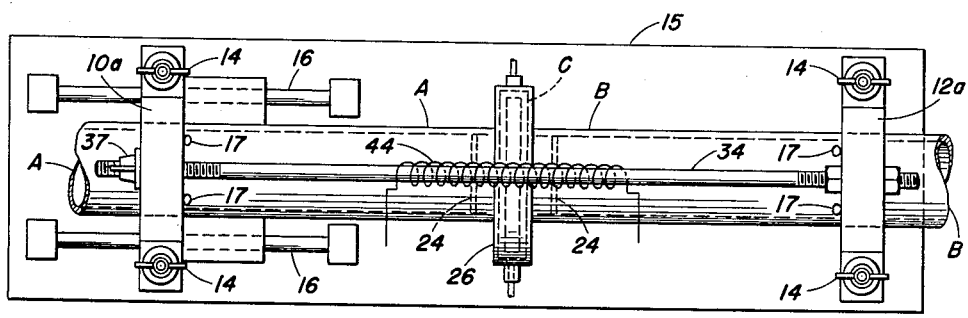
FIG. 2 is a plan view, taken on line 2—2 of FIG. 1, showing how the apparatus of FIG. 1 appears when viewed from the top.

In this manner the tubes A and B may be moved axially with respect to one another in a way permitting them to be initially separated as shown in FIG. 1 and thereafter to be brought into physical contact for welding as shown in FIG. 5. Each of these two tubes A and B preferably is provided with small projections 17 welded or otherwise secured thereto, as shown in FIGS. 1 and 2, immediately inside of the associated clamp blocks 10 and 12. Purpose of these projections 17 is to restrain said tubes A and B from endwise sliding through the clamp blocks 10 and 12 when the tube ends are pressed together to build up the required welding pressure. It will be understood that said clamp blocks 10 and 12 and said restraining projections 17 are here represented in highly simplified schematic form.

In accordance with the invention of the present divisional application said required welding pressure between the abutted ends of tubes A and B is provided by mechanically tying those tubes together through anchor points on opposite sides of the end abutting location, and then heating the material of the mechanical tie means before bringing the abutted tube ends together and utilizing the cooling contraction of those tie means to build up the needed welding pressure between said ends.

In the organization here illustratively shown said two anchor points are established by the aforesaid clamp blocks 10 and 12. These two blocks are tied together by bolts 34 and 36 which span the distance between the blocks and respectively extend through the upper and lower portions thereof; and if desired three such tie bolts can be used in place of the two here shown. With tubes A and B firmly clamped in blocks 10 and 12 as represented in FIG. 1, a tightening of wing nuts 37 on bolts 34 and 36 serves to advance moveable block 10 closer to stationary block 12 and thus brings the tube ends into the abutting contact shown by FIG. 5.

The aforementioned pressure between the abutted ends of tubes A and B which is requisite for welding is established by heating up the tie bolts 34 and 36 before said tube ends are brought together via a tightenting of clamp nuts 37 on said bolts, and with those nuts so tightened then cooling those heated tie bolts 34 and 36 to produce a contraction therein which pulls said abutted tube ends together and thus builds up the needed welding pressure. Such preheating of tie bolts 34 and 36 can be accomplished by electrical windings 44 and 46 wrapped around the bolts as shown in FIGS. 1 and 2. Closure of switch 48 connects those windings with a power source, and the resultant flow of bolt heating current can be adjusted by rheostat 49.

Once tie bolts 34 and 36 have been appropriately heated clamp nuts 37 are tightened thereon and switch 48 is opened. Cooling of said bolts can be hastened if desired by blowing air thereover or by making the bolts hollow (not shown) and flowing cooling water therethrough. The contraction which accompanies such cooling pulls clamp blocks 10 and 12 towards one another and thus pushes the abutted ends of tubes A and B together with an intensity sufficient to build up the pressure needed for welding.

As the description hereof proceeds it will become apparent that these illustrated tubes A and B to be welded may be of a wide variety of types and sizes. If of the type used in steam generating boilers and the like such tubes typically will be formed of ferrous metal (carbon steel, or chrome steel, or other alloy steel) or may have an inside diameter of the order of 3" and a wall thickness of the order of ¼"; if of the type used in steam power plant piping such tubes will be of larger diameters and wall thicknesses. Moreover the technique and apparatus here disclosed may also be used to weld the ends of tubes formed of metal other than iron or steel and having inside diameters less as well as greater than 3" and wall thicknesses less as well as greater than ¼".

Localized heating for raising the temperature of the end metal of aligned tubes A and B to welding value likewise may be supplied in any one of a number of different ways. In the illustrative arrangement here disclosed such localized welding heat is induced in said metal by an inductor coil C which concentrically surrounds those abutting tube ends in the manner shown by FIGS. 1, 2 and 3. This coil has the comparatively narrow width indicated and it may satisfactorily be made of copper.

The represented upper and lower halves of coil C (see FIG. 3) are separable to permit removal of the coil from around tubes A and B after the ends thereof have been welded together as shown in FIG. 6. To prevent overheating each of these upper and lower sections is provided with a narrow passage 19 (see also FIG. 1) through which a cooling fluid may be passed in the manner designated by the small arrows in FIG. 3. Water at room temperature or below may satisfactorily be used as such cooling fluid, and this cooling water can be passed into and out of the coil section interiors by means of flexible rubber tubing or the like.

Figure 3:
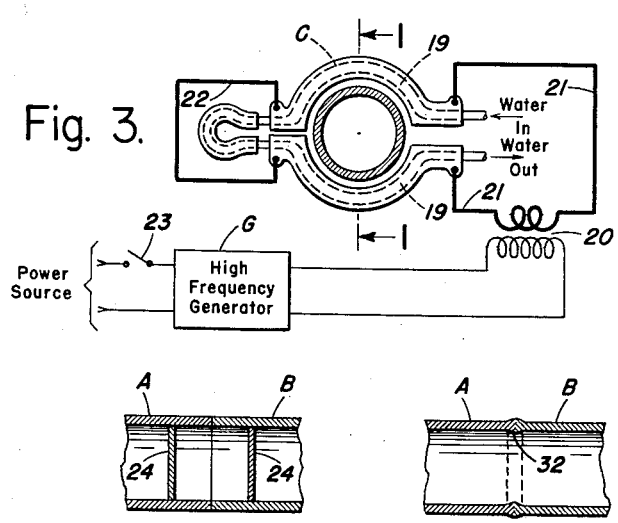
FIG. 3 is a simplified sectional elevation on line 3—3 of FIG. 1 showing one construction for the represented inductor heating coil and also diagramming typical circuits for supplying high frequency current to that coil.
Figure 4:
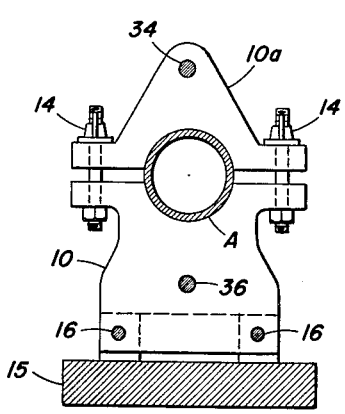
FIG. 4 is an end view on line 4—4 of FIG. 1 showing one of the support block and clamp assemblages with which the new welding apparatus is provided.

Said two-section inductor coil C is connected with a source of heating current diagrammed in FIG. 3 as including a transformer 20 whose low voltage and high amperage secondary winding is directly joined with said coil ends via conductors 21; the other ends of the upper and lower coil halves being interconnected by another conductor 22. The primary winding of transformer 20 is energized from a high frequency oscillation generator designated as G in FIG. 3. Since such generators are well known, no attempt to illustrate details is here made.

Instead it will suffice to say that upon closure of switch 23 generator G supplies transformer 20 with alternating current of a relatively high frequency typified by several thousand cycles per second (3 to 10,000 may be taken as illustrative). The intensity of this heating current as transmitted by transformer 20 to inductor coil C is adjusted to produce the requisite heating of tube ends A and B as will later be explained; this adjustment being accomplished at generator G in a well known manner so as to heat the tube end metal to a bright red color during the welding cycle.

In preparing the tubes A and B for welding it is in many instances desirable to place in the end of each a plug-like baffle shown at 24 in FIGS. 1, 2 and 5. These baffles 24 may satisfactorily be formed of cardboard or other material that is readily burnable or soluble in water and which is placed comparatively close to the end of its associated tube so that the compartment formed between said two baffles will have relatively small volume (see FIG. 1), and further, so that the heated end metal will during the welding cycle's final stages set fire to and burn both baffles to ash. In this way the passage through the welded tubes will automatically be unblocked without resort to mechanical ramming; or if the baffle material is water soluble these baffles 24 can be left in place and dissolved when water later is introduced into the welded tubes.

Supplementing the inductor heating coil C and the tube baffles 24 is a gas housing 26 of the general type more fully shown and described by Chapman Patent 2,542,393, issued February 20, 1951, under title of "Apparatus for Welding." This housing is represented schematically in FIGS. 1 and 2 only and no attempt has been made to show it in FIG. 3. It may be of two part or other construction suitable for ready removal from around the tubes A and B after same have been welded together as shown in FIG. 6.

As indicated by FIGS. 1 and 2 this housing 26 encloses the inductor coil C and fits around the ends of tubes A and B in reasonably gas tight manner. Purpose is to provide means for bringing a protective atmosphere into bathing contact with the weld metal parts prior to and during application of induction heating thereto. This atmosphere may take the form of an inert or other protective gas admitted into the interior of chamber 26 from some suitable source shown at 28 in FIG. 1 through a valve 29 and tubing 30.

Such amitted gas fills compartment 26, and with the ends of tubes A and B initially separated as in FIG. 1 it flows inwardly past the tube end metal radially through the gap separating the ends and thus fills into the space between adjacent baffles 24. Such infilling is aided by lack of perfect fit between baffles 24 and the tube walls, or if desired one of said baffles can be pierced (not shown) so as to allow the original air more readily to be displaced from that space by the entering protective gas.

When of requisite composition and purity this protective atmosphere serves to prevent objectionable oxidation of the tube ends A and B at the high temperatures to which the metal thereof is raised during the welding operation.

In utilizing the apparatus organization here disclosed for butt welding the ends of metal tubes A and B, these tubes first have their end faces machined clean just before placement of the tubes in their respective clamping blocks 10 and 12 where they are aligned in the general manner indicated by FIG. 1. In the open ends of these tubes the earlier mentioned baffles 24 are placed prior to this alignment; each baffle being positioned quite close to its tube end.

Thus prepared the two metal tubes A and B are secured in their supporting blocks 10 and 12 so as to leave between the tube ends an initial axial spacing somewhat less than the axial thickness of inductor coil C. Said coil is now placed around these aligned tube ends (see FIG. 1) and connected with its energizing source as shown in FIG. 3.

The atmosphere chamber 26 is thereupon placed around tubes A and B and coil C as shown in FIGS. 1 and 2 and connected with gas source 28. Valve 29 is now opened admitting protective gas from source 28 into the chamber 26 and between the tube ends A and B and also the space between baffles 24 and 24. Such admission is continued for a time sufficient to substantially purge all air from said tube end spaces and to fully replace same by the protective gas, and in this way objectionable oxidation of the metal end surfaces is prevented during later heating to welding temperature. At the same time cooling fluid is made available to the inner passages 19 of the inductor coil C.

The high frequency oscillation generator C is now turned on at switch 23 causing transformer 20 to flow through the upper and lower coil sections C high frequency alternating current which is effective to heat the extreme end portions of tubes A and B to welding temperature. Such temperature may be of the order of 2300 to 2400° F. and is accompanied by a comparatively bright red coloring of the heated tube end metal.

Choice is now had between several variations in the operating cycle. The first is taught by issued Chapman Patent 2,542,393 and in it the tube ends A and B remain separated as shown in FIG. 1 for the period of time needed to bring the tube metal to welding temperature after the high frequency oscillation generator G is turned on at switch 23. In a second variation, tube ends A and B (again following thorough purging by the protective atmosphere) are initially pressed together while still cold before oscillation generator G first comes into action to apply welding heat to these ends. In this second variation the pressure exerted against the tube ends when cold is continued after they become heated to welding temperature when it is effective to produce a slight weld upset indicated at 32 in FIG. 6. In a third variation the tube ends are brought together at some intermediate point in the period of their heating up to welding temperature.

The expansion pressure improvements of my invention are applicable to any of the foregoing modes of operation. As already indicated, said improvements provide the required pressure between the abutted ends of tubes A and B by mechanically tying those tubes together through anchor points 10 and 12 on opposite sides of the end abutting location, and then heating the metal of the mechanical tie bolts 34 and 36 before bringing the abutted tube ends together and thereafter utilizing the cooling contraction of those tie bolts to build up the needed welding pressure between said ends.

Representative facilities for accomplishing the foregoing were described at an earlier point herein.

In using the here-disclosed "tie bolt heating" form of my new pressure-creating facilities, switch 48 first is closed thereby causing windings 44 and 46 to heat up tie bolts 34 and 36 and expand their length; clamp nuts 37 then are tightened on those bolts to bring the ends of tubes A and B into contacting abutment while the bolts are thus expanded; and switch 48 now is opened with resultant cooling on the part of said bolts 34 and 36. The accompanying contraction of those bolts pulls clamp blocks 10 and 12 towards each other and thus builds up the needed welding pressure between the abutted ends of tubes A and B. Such bolt cooling and pressure build up take place while said tube ends are being heated to welding temperature by the inductor coil C, and in this way the desired final weld 32 (FIG. 6) is achieved.

Choice of how far anchor point clamp blocks 10 and 12 are spaced from the tube end abutting location (at which coil C is positioned) will depend upon a number of factors including the diameter and wall thickness of the tubes A and B.

How the complete welding organization here illustrated operates will have become more or less apparent from the foregoing description of the elements and components that make up said organization. Once the tube ends A and B are bathed in protective gas from source 28, expansion heating current can be applied (via switch 48) to tie-bolt heating windings 44 and 46 before and at the time that welding heating current is applied (via switch 23) to inductor heating coil C. As said coil C brings the tube end metal up to welding temperature (in the range of from 2300 to 2400° F. as before stated) the expansion heating windings 44 and 46 cause lengthening of the metal bolts 34 and 36 by which anchor points 10 and 12 are tied together; and while those bolts are so lengthened wing nuts 37 are tightened to bring the tube ends A and B into abutting contact. Switch 48 now is opened to cut off the tie-bolt heating current. This permits the tie bolts 44 and 46 to cool and contract with resultant build up of abutting pressure between the tube ends A and B. The protective gas flowing into housing 26 likewise now can be cut off by closing valve 29.

The heating current applied by generator G to inductor coil C is thereafter continued beyond the time that the tube ends are pressed together and initially welded at 32 (FIG. 6), the period of which continuance is dependent upon the size and thickness of the tube material and typically will be of the order of minutes. This latter period of heat application to the tube junction 32 is spoken of as "soaking" and it serves the useful purpose of promoting diffusion within the weld fusion zone of residual impurities.

At the end of said soaking period the weld heating current is cut off by opening switch 23. The top halves 10a and 12a of clamp blocks 10 and 12 are released by removing wing nuts 14 and those top halves together with tie bolt 34 are lifted away from the apparatus assemblage. Likewise the gas housing 26 and the inductor coil C are removed from around the welded tube juncture; and the two tubes A and B so joined together at 32 now can be removed from their clamp blocks 10 and 12 and withdrawn from the apparatus. The baffles 24—24 being of combustible material were ignited by the welding heat of tubes A and B during completion of the welding cycle. The apparatus is now ready to receive other tubes (corresponding to A and B) that are to be welded together in the same manner as has just been described.

From the foregoing description of one representative embodiment of this invention it will be seen that the expansion pressure welding technique and facilities herein disclosed are extensive in their application and hence are not to be restricted to the specific form here shown and described by way of illustration.

What is claimed is:

1. In the art of welding metals by a pressure technique wherein first and second metal parts to be joined are held in aligned and abutted relation by means of two relatively movable anchor points disposed along the length of said first and second parts and having metal tie members extending therebetween, and wherein said parts are associated with weld heating means which, when activated, impart localized welding heat to the abutting ends of said parts, comprising the steps of securing said anchor points to each of said parts at positions spaced from the adjacent ends thereof, imparting a controlled amount of heat to said tie members independently of the heat generated by said weld heating means thereby thermally expanding said tie members, thereafter mechanically moving said anchor points together to bring the adjacent ends of said parts into mutual physical contact, securing said anchor points to said tie members, applying weld heat to the ends of said parts sufficient to effect a bond therebetween, cooling said tie members while the ends of said parts are at the welding temperature to effect therein a controlled contraction which pulls the spaced anchor points together with a predetermined intensity sufficient to impart to the ends the pressure necessary to effect an efficient bond therebetween.

2. In apparatus for butt welding the ends of first and second metal tubes, the combination of means effective to hold said tubes in axially aligned relation and to permit movement of said tube ends into abutting contact, said holding means comprising a first support, clamping means attached to said support for securing the same to one of said tubes, a second support aligned with but spaced from said first support, clamping means attached to said second support for securing the same to the other of said tubes, means permitting relative movement between said tube supports, at least one metal tie member extending between said supports, weld heating means effective to impart localized welding heat to the abutting ends of said tubes, tie member heating means controlled independently of said weld heating means to effect heating and axial thermal expansion of said tie members, means to effect mechanical movement of said tube supports toward one another to bring the adjacent ends of said tubes into abutting relation, said last mentioned means also securing said supports to said tie members whereby upon discontinuation of operation of the tie member heating means, the tie members cool and thermally contract forcing the tube ends together a degree necessary to impart to the tube ends the pressure required to achieve an efficient weld.

3. In apparatus for butt welding the ends of first and second metal tubes, the combination of means effective to hold said tubes in axially aligned relation and to permit movement of said tube ends into abutting contact, said holding means comprising a first support, clamping means attached to said support for securing the same to one of said tubes at a point intermediate the ends thereof, a second support aligned with but spaced from said second support, clamping means attached to said second support for securing the same to the other of said tubes at a point intermediate its ends, slide means permitting relative movement between said tube supports, a plurality of metal tie members extending between said supports, weld heating means effective to impart localized welding heat to the abutting ends of said tubes, tie member heating means encompassing a portion of said tie members to effect heating and axial thermal expansion of said tie members, control means for the tie member heating means for adjusting the amount of heating and thereby the amount of thermal expansion of said tie members and fastener means threadedly attached to said tie members to secure said tube supports to said tie members and to effect mechanical movement of said tube supports toward one another in order to effect mutual contact of the adjacent tube ends whereby, upon discontinuation of operation of the tie member heating means the tie members cool and contract forcing the support together to a degree necessary to impart to the tube ends the pressure required to achieve an efficient weld.

References Cited in the file of this patent
UNITED STATES PATENTS

| | | |
|---|---|---|
| 918,745 | Goldschmidt et al. | Apr. 20, 1909 |
| 925,630 | Goldschmidt et al. | June 22, 1909 |
| 1,149,518 | Holmes | Aug. 10, 1915 |
| 1,246,909 | Goldschmidt | Nov. 20, 1917 |
| 1,561,224 | Fritsche | Nov. 10, 1925 |
| 1,636,057 | Jones | July 19, 1927 |
| 2,040,240 | Coberly et al. | May 12, 1936 |
| 2,176,601 | Bates | Oct. 17, 1939 |
| 2,306,709 | Miller | Dec. 29, 1942 |
| 2,480,863 | Kerr et al. | Sept. 6, 1949 |
| 2,649,527 | Chapman et al. | Aug. 18, 1953 |
| 2,730,599 | Ronay | Jan. 10, 1956 |
| 2,787,956 | Kirby et al. | Apr. 9, 1957 |
| 2,794,244 | Uecker | June 4, 1957 |
| 2,910,933 | Danly | Nov. 3, 1959 |